(12) United States Patent
Liu et al.

(10) Patent No.: US 9,223,337 B2
(45) Date of Patent: Dec. 29, 2015

(54) SINGLE LAYER SELF-CAPACITANCE TOUCH SCREEN REALIZING MULTI-TOUCH IDENTIFICATION AS WELL AS ITS DATA PROCESSING METHOD

(71) Applicants: Weiping Liu, Shenzhen (CN); J K Zhang, Shenzhen (CN)

(72) Inventors: Weiping Liu, Shenzhen (CN); J K Zhang, Shenzhen (CN)

(73) Assignee: FocalTech Systems, Ltd., Grand Cayman (KY)

( * ) Notice: Subject to any disclaimer, the term of this patent is extended or adjusted under 35 U.S.C. 154(b) by 237 days.

(21) Appl. No.: 13/929,267

(22) Filed: Jun. 27, 2013

(65) Prior Publication Data
US 2014/0009438 A1    Jan. 9, 2014

(30) Foreign Application Priority Data
Jan. 21, 2013 (CN) .......................... 2013 1 0021178

(51) Int. Cl.
*G06F 1/16* (2006.01)
*G06F 3/044* (2006.01)

(52) U.S. Cl.
CPC ........ *G06F 1/16* (2013.01); *G06F 3/044* (2013.01); *G06F 2203/04104* (2013.01)

(58) Field of Classification Search
None
See application file for complete search history.

(56) References Cited

U.S. PATENT DOCUMENTS

| 8,482,497 B2* | 7/2013 | Zhang et al. ................ 345/85 |
| 2008/0062148 A1* | 3/2008 | Hotelling et al. ............ 345/174 |

* cited by examiner

*Primary Examiner* — Jason Olson
*Assistant Examiner* — Parul Gupta
(74) *Attorney, Agent, or Firm* — Westman, Champlin & Koehler, P.A.

(57) ABSTRACT

A single layer self-capacitance touch screen and its data processing method which can realize multi-touch identification, the said touch screen includes at least two self-capacitance electrode assemblies independent of each other, all of which are located in the same plane layer and fully cover the whole touch zone of the touch screen without overlapping each other; the said self-capacitance electrode assembly includes at least a pair of self-capacitance coupling electrode couples, which include two electrode plates seated in the same plane, and these two electrode plates all include their own straight-line electrode plate coupling side and straight-line electrode plate base, which have included angle of acute angle; in the self-capacitance electrode assembly, the center lines of the self-capacitance coupling electrode couples are placed parallel to each other, and the center lines of arbitrarily two self-capacitance coupling electrode couples are also placed parallel to each other. This invention fully utilizes simple technological structure feature of single layer self-capacitance touch screen and realizes multi-point touch control function at possible lowest manufacturing cost.

2 Claims, 5 Drawing Sheets

SINGLE LAYER SELF-CAPACITANCE TOUCH SCREEN REALIZING MULTI-TOUCH IDENTIFICATION AS WELL AS ITS DATA PROCESSING METHOD

The present application claim priority of Chinese patent application Serial No. 201310021178.X, filed Jan. 21, 2013, the content of which is hereby incorporated by reference in its entirely.

TECHNICAL FIELD

The invention relates to a touch screen for data entry as well as its data processing method, especially a touch screen as well as its data processing method based on self capacitance principle.

BACKGROUND ART

The prior technology with respect to the ordinary two-layer mutual capacitance touch screen can realize real multi-touch, nevertheless, two-layer electrode plates are required to be laid, most of which are made of transparent conducting material Indium Tin Oxide (hereinafter referred to as ITO), thus, giving rise to high manufacturing cost. In addition, structure for most of the touch screen with respect to the prior technology includes Glass/Glass structure (hereinafter referred to as GG structure), Glass/Film/Film structure (hereinafter referred to as GFF structure), and One Glass Solution structure (hereinafter referred to as OGS structure). The adoption of such technological structures requires two layers of ITO, or ITO used to drive electrode and middle bridge for ITO used as sensor electrode. Production processes for such practices are all complicated, so the cost is high.

Figure 7:
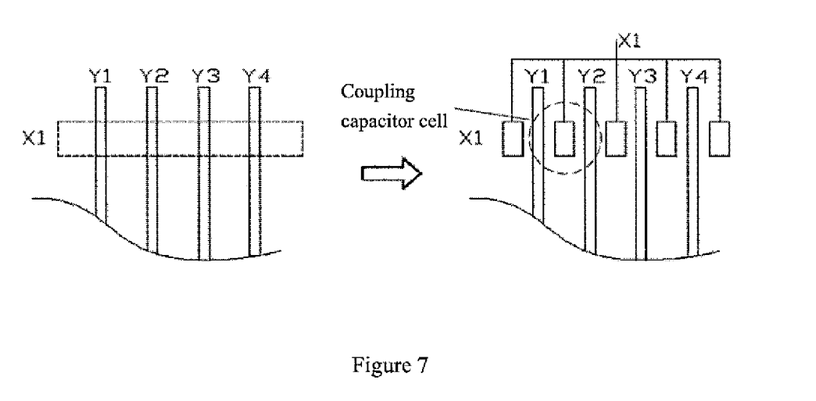
FIG. 7 is Realization principle diagram for the prior technology-single layer mutual capacitance touch screen.

Besides, there is also the scheme for single layer mutual capacitance touch screen with respect to the prior technology, single layer ITO can be used as the electrode for mutual capacitance. As is shown in FIG. 7, a kind of electrode plate is placed in the clearance between the other kind of electrode plates, electrodes of the same line are connected to the outside of the screen through transparent ITO lead, then, electrodes of the same line are connected to the exterior of the effective touch zone. Both technology and cost for single layer mutual capacitance touch screen are more downsized than that for traditional two layer mutual capacitance, nevertheless, its electrode pattern is relatively complicated. There are numerous lines (usually more than 150 lines are required) connected to the outside of the active zone for touch screen, thus, high requirement is imposed on the precision of production process, at the meantime, yield rate will also be reduced.

Figure 8:
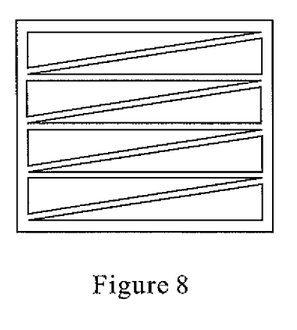
FIG. 8 is Electrode structure diagram for the prior technology-single layer self-capacitance touch screen.

The simplest electrode pattern is a single layer self-capacitance touch screen scheme, consisting of complementary near-triangle electrodes, as is shown in FIG. 8. Electrode pattern for such scheme is simple, with comparatively fewer lines, namely, about 30 lines are required for the touch screen whose dimension is around 4 inches. However, under some circumstances, self-capacitance touch screen adopting such near-triangle complementary pattern fails to realize multi-touch, because with respect to the method of computing coordinate data for touch points, it calculates coordinate adopting touch change rate at horizontal direction and touch change in center of gravity at the vertical direction. For example, when multi-touch points occur on the same horizontal line, coordinates at vertical direction for all touch points detected worked out adopting touch change in center of gravity are the same, coordinates at horizontal direction can't be calculated for various points detected can't be distinguished via touch change at horizontal direction, consequently, multi-touch can't be realized on the same horizontal electrode. For the same reason, multi-touch can't be realized on the same vertical line. Therefore, defect is obvious with respect to the multi-touch function for the above single layer self-capacitance scheme.

CONTENT OF THE INVENTION

In view of the above-described problems, the aim of the invention are to avoid defeats in the prior technology and to provide a single layer self-capacitance touch screen realizing multi-touch identification as well as its data processing method, so the multi-touch functionality can be realized in the single layer self-capacitance touch screen.

The purpose of the invention is achieved by the following technical schemes:

Design and manufacture a single layer self-capacitance touch screen which can realize multi-touch identification, including data processing module. Especially, it also includes at least two mutually independent self-capacitance electrode assemblies, all of which are located in the same plane layer and fully cover the whole touch zone of the touch screen without overlapping each other. The said self-capacitance electrode assembly includes at least a pair of self-capacitance coupling electrode couples. The self-capacitance coupling electrode couple includes two electrode plates in the same plane. Both the two electrode plates include respective straight-line electrode plate coupling edge and straight-line electrode plate base, and there is an acute angle between the said electrode plate coupling edge and base. Electrode plates base respectively for two electrode plates belonging to the same self-capacitance coupling electrode couple are placed at both sides of the self-capacitance coupling electrode couples to which they belong parallel to each other. Electrode plate coupling edge respectively for the two electrode plates are placed at the middle part of the self-capacitance coupling electrode couple to which they belong also parallel to each other. Within the self-capacitance electrode assembly, centre lines for respective self-capacitance coupling electrode couples are placed parallel to each other, and centre lines for arbitrary two self-capacitance coupling electrode couples belonging respectively to different self-capacitance electrode assemblies are also placed parallel to each other. Centre line of the said self-capacitance coupling electrode couple is the centre line parallel to the two electrode plate bases the self-capacitance coupling electrode couple. All electrode plates are electrically connected to the said data processing module directly or indirectly.

Shape solution for one said electrode plate is that two electrode plates belonging to the same pair of self-capacitance coupling electrode couples also include two electrode plate edges placed parallel to each other respectively, consequently, the electrode plate is the trapezoidal electrode plate taking the two electrode plates edges as the bases, electrode plate coupling edge and electrode plate base as waists.

Shape solution for another electrode plate as mentioned is that two electrode plates belonging to the same pair of self-capacitance coupling electrode couples also include an electrode plate edge respectively, and the electrode plate coupling edge of the said electrode plate meets the electrode plate base at a point, thereby, the said electrode plate is a triangular electrode plate formed by electrode plate edge, electrode plate coupling edge and electrode plate base.

Moreover, along the direction of the electrode plate base perpendicular to the electrode plate, the electrode plate base of two adjacent electrode plates respectively belonging to two adjacent self-capacitance coupling electrode couples are connected into an adjacently connected electrode plate.

The purpose of the invention is achieved by the following technical schemes:

Implement the coordinate data processing method based on the aforementioned single layer self-capacitance touch screen, including the following steps:

A. Detect all data of self-capacitance change and make statistics that all self-capacitance change data are detected from "Q" sets of self-capacitance electrode assemblies; that is, "Q" sets of self-capacitance change data arrays are detected, with one set of self-capacitance change data array including at least one set of self-capacitance change data;

B. If Q is larger than 1, execute Step C; if Q is equal to 1, execute Step F;

C. Execute Step D for "Q" sets of self-capacitance change data arrays respectively in proper order;

D. Process all self-capacitance change data in one set of self-capacitance change data array respectively into one set of coordinate data array;

E. After all Q sets of self-capacitance change data arrays have been processed as per Step D, integrate Q sets of coordinate data arrays acquired upon processing to obtain actual coordinate data of each touch point, then, execute Step H;

F. Process all self-capacitance change data in one set of self-capacitance change data array respectively into one set of coordinate data array;

G. Execute Step H;

H. The final coordinate data of the touch points are obtained.

Specifically, the following proposal can be adopted for integrating the processing data as stated by Step E, which shall include the following sub-steps:

E1. According to Q sets of coordinate data arrays, identify whether there is the condition that one touch point is simultaneously located in at least two adjacent self-capacitance electrode assemblies;

E2. If the condition described in Step E1 exists, the coordinate data reflecting that one touch point is simultaneously located in at least two adjacent self-capacitance electrode assemblies shall be combined into one coordinate data;

E3. If the condition described in Step E1 does not exist, Q sets of coordinate data arrays shall be adopted;

E4. Execute Step H.

More specifically, the said Sub-step E1 also comprises the following sub-steps:

E11. Set the minimum distance threshold for the coordinate;

E12. Execute Step E13 to all coordinate data respectively in proper order;

E13. Calculate the coordinate distance between the coordinate point confirmed by the coordinate data and the coordinate points confirmed by other coordinate data respectively, and judge whether the near range coordinate point (coordinate distance shorter than the minimum distance threshold of the said coordinate) exists; if there is near range coordinate point, record a group of overlapping coordinate data array, such overlapping coordinate data include the coordinate data corresponding to all near range coordinate points and data of the coordinate;

E14. After Step E13 has been executed to all coordinate data respectively in proper order, acquire at least one group of overlapping coordinate data array, and execute Sub-step E2;

E15. After Step E13 has been executed to all coordinate data respectively in proper order, if overlapping coordinate data array hasn't been acquired, execute Sub-step E3.

With respect to specific solution for data merge of Step E2, the said Sub-step E2 also includes the following sub-steps:

E21. Calculate centroid coordinate data at the area surrounded by all the coordinate points confirmed by all the coordinate data in the overlapping coordinate data array, the centroid coordinate data refers to the coordinate data of the touch points simultaneously located in at least two adjacent self-capacitance electrode assemblies.

Compared to the existing technology, technical effect of the invention "single layer self-capacitance touch screen and its data processing method realizing multi-touch identification" is that:

The invention has improved the single layer self-capacitance touch screen, overcome the defects of the existing technology with respect to mono-block self-capacitance touch screen via multiple independent self-capacitance electrode assemblies, given full play to the characteristic featured by simple technological structure of the single layer self-capacitance touch screen, and realized the multi-touch function with manufacturing cost as low as possible.

MODE OF CARRYING OUT THE INVENTION MODEL

To further illustrate the principle and structure of the invention, the invention is further described in detail in accordance with the preferable embodiments shown in the figures.

Figure 1:
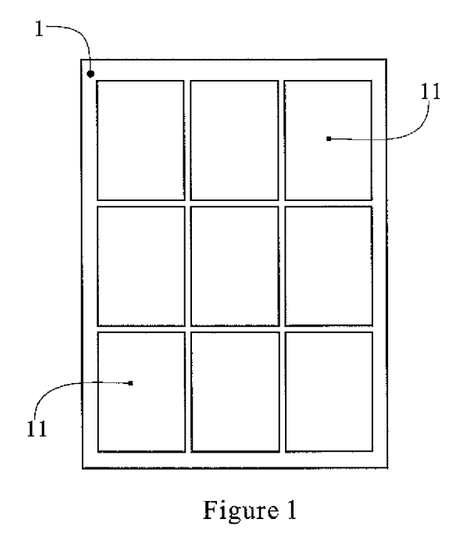
FIG. 1 is Structure diagram for the first embodiment of the invention "single-layer self-capacitance touch screen and its data processing method realizing multi-point touch identification"
Figure 2:
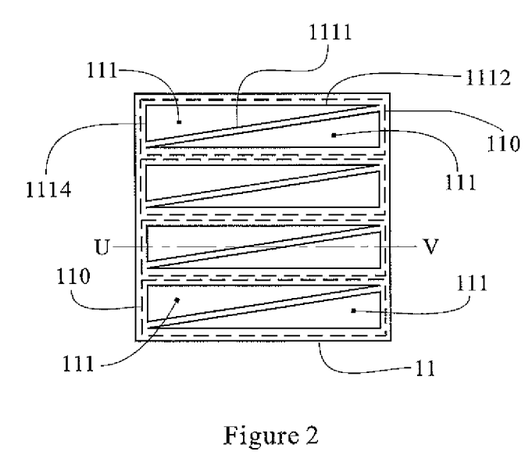
FIG. 2 is Electrode structure diagram for a self-capacitance electrode assembly 11 of the said first embodiment.
Figure 3:
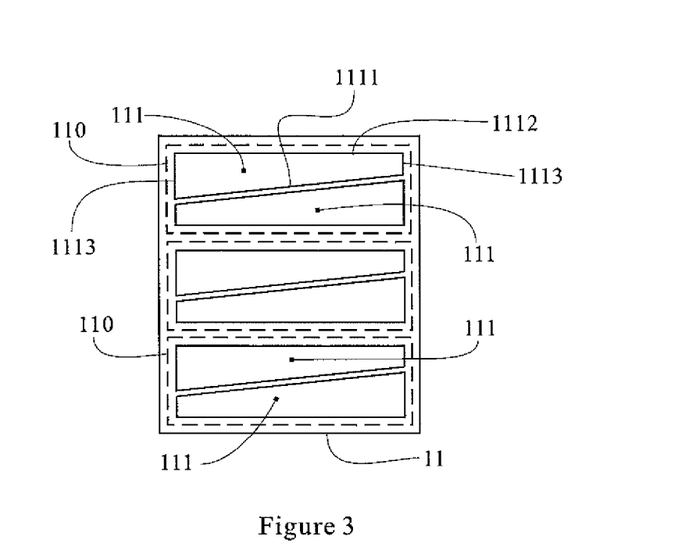
FIG. 3 is Electrode structure diagram for a self-capacitance electrode assembly 11 of the second embodiment.

The invention has provided a single layer self-capacitance touch screen 1 which can realize multi-touch identification, including data processing modules, shown by FIG. 1 to FIG. 3. Especially, the said self-capacitance touch screen also including at least two mutually independent self-capacitance electrode assemblies 11, all of which are located in the same plane layer covering all over the touch zone of the whole touch screen 1 with no mutual overlapping. The said self-capacitance electrode assembly 11 includes at least a pair of self-capacitance coupling electrode couples 110. The self-capacitance coupling electrode couple 110 includes two electrode plates 111 in the same plane. Both the two electrode plates 111 include respective straight-line electrode plate coupling edge 1111 and straight-line electrode plate base 1112, and there is an acute angle between the said electrode plate coupling edge 1111 and the electrode plate base 1112. Electrode plate base 1112 respectively for two electrode plates 111 belonging to the same self-capacitance coupling electrode couple 110 are placed at both sides of the self-capacitance coupling electrode couple 110 to which they belong parallel to each other. Respective electrode plate coupling edge 1111 of the two electrode plates 111 are also placed at the middle part of the self-capacitance coupling electrode couple 110 to which they belong parallel to each other. Within the self-capacitance electrode assembly 11, centre lines UV for respective self-capacitance coupling electrode couples 110 are placed parallel to each other, and centre lines UV for arbitrary two self-capacitance coupling electrode couples 110 belonging to different self-capacitance electrode assemblies 11 are also placed parallel to each other. Centre line UV of the said self-capacitance coupling electrode couple 110 is the centre line of the two electrode plate bases 1112 parallel to the self-capacitance coupling electrode couple 110. All electrode plates 111 are electrically connected to the said data processing module directly or indirectly.

Evidently, if there are N self-capacitance electrode assemblies, identification of N-point touch can be realized, when area of the self-capacitance electrode assembly is as small as approximating to the finger touch surface, multi-touch identification will be realized really.

The first embodiment of the invention as is shown by FIG. 2 features that two electrode plates 111 belonging to the same pair of self-capacitance coupling electrode couple 110 also include one electrode plate edge 1114 respectively, and the electrode plate coupling edge 1111 of the said electrode plate 111 and the electrode plate base 1112 meet at one point, thus, the said electrode plate 111 is the triangular electrode plate bounded by the electrode plate edge 1114, electrode plate coupling edge 1111 and electrode plate base 1112.

The second embodiment of the invention as shown by FIG. 3 features that shape solution for the said electrode plate is that two electrode plates 111 belonging to the same pair of self-capacitance coupling electrode couples 110 also include two electrode plate edges 1113 placed parallel to each other respectively, consequently, the electrode plate 111 is the trapezoidal electrode plate taking the two electrode plates edges 1113 as the bases, electrode plate coupling edge 1111 and electrode plate base 1112 as waists.

Figure 4:
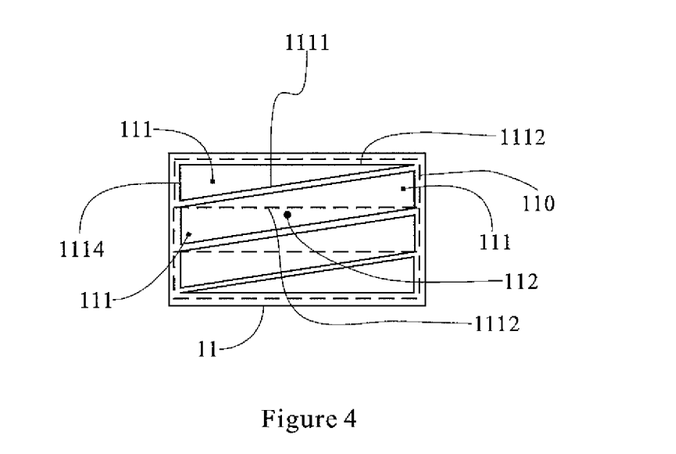
FIG. 4 is Electrode structure diagram for a self-capacitance electrode assembly 11 of the third embodiment.

In addition, two adjacent electrode plates 111 respectively belonging to two adjacent self-capacitance coupling electrode couples 110 can be combined into one electrode plate. The third embodiment of the invention as shown in FIG. 4 features that along the direction vertical to the electrode plate bases 1112 of the electrode plates 111, electrode bases 1112 of the two adjacent electrode plates 111 respectively belonging to two adjacent self-capacitance coupling electrode couples 110 are connected to one adjacently connected electrode plate 112.

Figure 5:
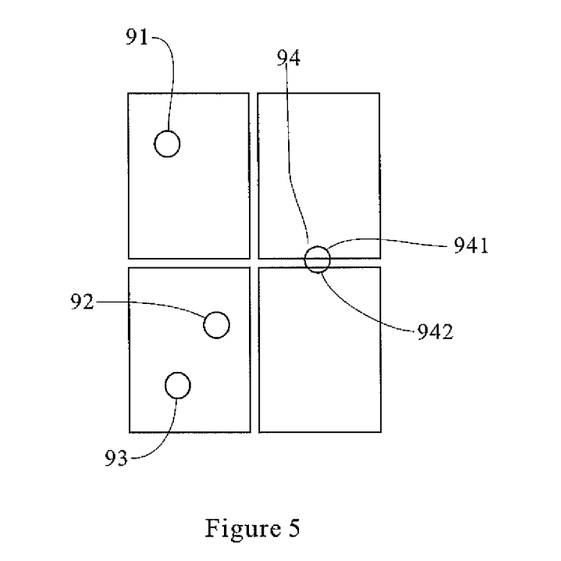
FIG. 5 is Multi-touch diagram for the said first embodiment.

Coordinate data processing method based on the aforementioned single layer self-capacitance touch screen 1 of the invention includes the following steps:

A. Detect all data of self-capacitance change and make statistics that all self-capacitance change data are detected from "Q" sets of self-capacitance electrode assembly; that is, "Q" sets of self-capacitance change data arrays are detected, with one set of self-capacitance change data array including at least one set of self-capacitance change data; the first embodiment of the invention as shown by FIG. 5 features that taking the four-point touch occurred on the said single layer self-capacitance touch screen 1 as an example, five self-capacitance change data will be detected when single layer self-capacitance touch screen 1 is simultaneously touched by touch point 91-94, namely, self-capacitance change data from touch point 91-93, 941 and 942 are respectively detected; self-capacitance change data relating to touch point 941 and 942 are formed due to the simultaneous touch into two self-capacitance electrode assemblies by touch point 94; thereby, the five self-capacitance change data are detected from 4 sets of self-capacitance electrode assemblies, one set of self-capacitance change data array only involves the self-capacitance change data incurred by touch point 91, one set of self-capacitance change data array involves self-capacitance change data incurred by touch point 92 and 93, one set of self-capacitance change data array only involves self-capacitance change data incurred by touch point 941, and one set of self-capacitance change data array only involves self-capacitance change data incurred by touch point 942; obviously, there are more than one self-capacitance change data in one set of self-capacitance change data array.

B. If Q is greater than 1, execute Step C; if Q is equal to 1, execute Step F; obviously, Step C will be executed in case of the situation shown by FIG. 5;

C. Execute Step D for "Q" sets of self-capacitance change data arrays respectively in proper order;

D. Process all self-capacitance change data in one set of self-capacitance change data array respectively into one set of coordinate data array; in the case of FIG. 5, there will be 4 sets of coordinate data arrays, and 5 coordinate data in total, namely, coordinate data involving touch point 91 ($X_{91}$, $Y_{91}$), touch point 92 ($X_{92}$, $Y_{92}$), touch point 93 ($X_{93}$, $Y_{93}$), touch point 941 ($X_{941}$, $Y_{941}$), and touch point 942 ($X_{942}$, $Y_{942}$); wherein, coordinate data involving touch point 92 ($X_{92}$, $Y_{92}$) and touch point 93 ($X_{93}$, $Y_{93}$) belong to the same set of coordinate data array;

E. After all Q sets of self-capacitance change data arrays have been processed via Step D, integrate Q sets of coordinate data arrays acquired upon processing, so as to acquire actual coordinate data of various touch points, and execute Step H; as is shown by FIG. 5, the said integration means integrating the coordinate data involving touch point 941 ($X_{941}$, $Y_{941}$) and touch point 942 ($X_{942}$, $Y_{942}$) into the coordinate data involving touch point 94 ($X_{94}$, $Y_{94}$);

F. Process various self-capacitance change data in one set of self-capacitance change data array respectively into one set of coordinate data array; when Q equals to 1, indicating that there is only one self-capacitance electrode assembly in which touch occurs, and such touch is not always single point touch, under the circumstance when area of the self-capacitance electrode assembly is not large enough, multi-touch may occur, therefore, there will be at least one self-capacitance change data for one set of self-capacitance electrode change data array herein;

G. Execute Step H;

H. The final coordinate data for the touch points are obtained. As to the circumstance shown by FIG. 5, the final coordinate data for the touch points shall be coordinate data involving touch point 91 ($X_{91}$, $Y_{91}$), touch point 92 ($X_{92}$, $Y_{92}$), touch point 93 ($X_{93}$, $Y_{93}$), and touch point 94 ($X_{94}$, $Y_{94}$);

Specific solution as following can be adopted with respect to integrating the processed data stated by Step E of the invention, the said Step E includes the following sub-steps:

E1. According to Q sets of coordinate data arrays, identify whether the touch point is simultaneously located in at least two adjacent self-capacitance electrode assemblies;

E2. If the circumstance as stated by Step E1 exists, namely, the condition of touch point 941 and 942 as shown by FIG. 5, combine the coordinate data reflecting the simultaneous location of touch points in at least two adjacent self-capacitance electrode assemblies into one coordinate data; namely, combine touch point 941 and 942 as shown in FIG. 5 into touch point 94;

E3. If the circumstance described in Step E1 does not exist, Q sets of coordinate data arrays shall be adopted;

E4. Execute Step H.

Figure 6:
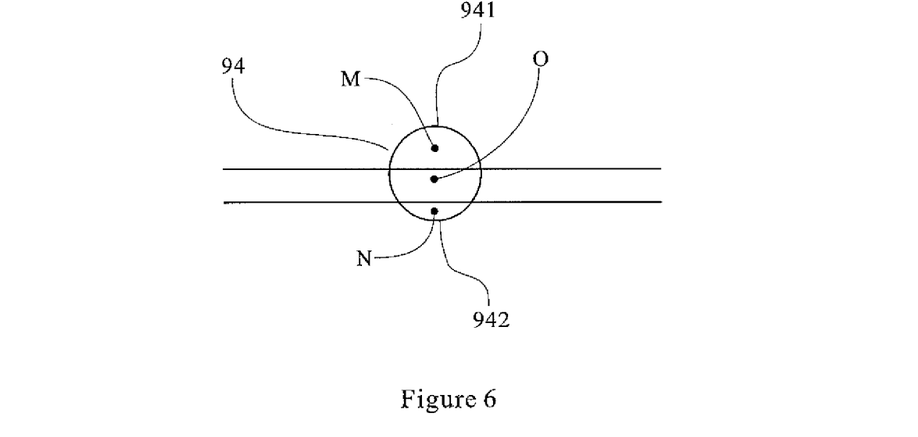
FIG. 6 is Partial amplified diagram for touch point 94 as is shown by FIG. 5.

The invention has provided more specific solution to realize data integration, the said Step E1 also includes the following sub-steps:

E11. Set the minimum distance threshold for the coordinate;

E12. Execute Step E13 to all coordinate data respectively in proper order;

E13. Calculate the coordinate distance between the coordinate point confirmed by the coordinate data and the coordinate points confirmed by other coordinate data respectively, and judge whether the near range coordinate point (coordinate distance shorter than the minimum distance threshold of the said coordinate) exists; if there is near range coordinate point, record a group of overlapping coordinate data arrays, such overlapping coordinate data include the coordinate data corresponding to all near range coordinate points and data of the coordinate; as is shown by FIG. 5 and FIG. 6, near range coordinate point N will be found as long as sub-step E13 has been implemented to the coordinate point M confirmed by the coordinate data( ), namely, the coordinate point confirmed by the coordinate data( ), then, the coordinate data( ) and coordinate data( ) corresponding to the near range coordinate point constitute overlapping coordinate data; when there are more than one overlapping coordinate data, overlapping coordinate data array is acquired through sub-step E13;

E14. After Step E13 has been executed to all coordinate data respectively in proper order, acquire at least one group of overlapping coordinate data array, and execute Sub-step E2;

E15. After Step E13 has been executed to all coordinate data respectively in proper order, if overlapping coordinate data array hasn't been acquired, execute Sub-step E3.

With respect to specific solution for data merge mentioned by Step E2, the said Sub-step E2 also includes the following sub-steps:

E21. According to the coordinate data within the overlapping coordinate data array, calculate the centroid coordinate data at the area enclosed by all the coordinate points confirmed by all the coordinate data within the overlapping coordinate data array, the centroid coordinate data refers to the coordinate data of the touch points simultaneously located in at least two adjacent self-capacitance electrode assemblies. As is shown in FIG. 6, because coordinate point M and N confirmed by overlapping coordinate data respectively, namely, coordinate data $(X_{941}, Y_{941})$ and $(X_{942}, Y_{942})$ can only constitute straight-line, centroid coordinate data obtained via sub-step E21 shall be the coordinate data corresponding to Point O between M and N, namely $(X_{94}, Y_{94})$.

The following examples are methods for calculating coordinate data involved in Step D and Step F.

Taking the electrode structure of the first embodiment as an example, suppose capacitance values for the triangular electrode plate within the self-capacitance electrode assembly are T11, T12, T21, T22, T31, T32, ... TZ1, TZ2, T11 and T12 are respectively the capacitance values of the two electrode plates corresponding to the self-capacitance coupling electrode couple marked as number 1, and TZ1 and TZ2 are respectively the capacitance values of the two electrode plates corresponding to self-capacitance coupling electrode couple marked as number Z. Obviously, T11, T21, ..., TZ1 correspond to electrode plate capacitance values located at the same side, while T12, T22, ..., TZ2 correspond to electrode plate capacitance values located at the same side of the other group. When a contact touches the inside of the said self-capacitance electrode assembly area, Tii capacitance will be affected, thereby, touch variation takes place to the corresponding electrode. Suppose T21, T22, TL31, TL32, TL41 and TL42 are affected by the location of the touch point, capacitance variation corresponding to each electrode are respectively ΔT21, ΔT22, ΔT31, ΔT32, ΔT41 and ΔT42. Then, space average measurement can be carried out to the vertical coordinate of the touch point through the changed capacitance variation of the electrode, namely "center of gravity" algorithm, specifically as following: the said vertical coordinate is perpendicular to the centre line UV of the said self-capacitance coupling electrode couple 110;

$$Y=((\Delta TL21+\Delta TL22)*2+(\Delta TL31+\Delta TL32)*3+(\Delta TL41+\Delta TL42)*4)/(\Delta TL21+\Delta TL22+\Delta TL31+\Delta TL32+\Delta TL41+\Delta TL42)$$

Capacitance values for the electrode plate whose touch points have been changed include capacitance value TL 21, TL 31 and TL 41 of the triangular electrode plate at one side, and TL22, TL 32 and TL42 for triangular electrode at the other side. Coordinate information for the touch point at horizontal coordinate X-direction can be obtained via the capacitance variation proportion of the electrode plate at both sides, and the said horizontal coordinate is parallel to the centre line UV of the said self-capacitance coupling electrode couple (110);

$$X=(\Delta TL21+\Delta TL31+\Delta TL41)/(\Delta TL22+\Delta TL32+\Delta TL42)*K,$$

wherein K is the proportionality coefficient of X-coordinate.

Thereby, a self-capacitance variation data is converted to the coordinate data via the above method.

What is claimed is:

1. A coordinate data processing method based on single layer self-capacitance touch screen is characterized in that it comprises the following steps:
    A. Detect all data of self-capacitance change and make statistics that all self-capacitance change data are detected from "Q" sets of self-capacitance electrode assemblies; that is, "Q" sets of self-capacitance change data arrays are detected, with one set of self-capacitance change data arrays including at least one set of self-capacitance change data;
    B. When Q is larger than 1, execute Step C; if Q is equal to 1, execute Step F;
    C. Execute Step D for "Q" sets of self-capacitance change data arrays respectively in proper order;
    D. Process all self-capacitance change data in one set of self-capacitance change data array respectively into one set of coordinate data array;
    E. After all Q sets of self-capacitance change data arrays have been processed as per Step D, Q sets of coordinate data arrays acquired shall be integrated upon processing so as to obtain actual coordinate data of each touch point, thereby executing Step H;
    F. Process all self-capacitance change data in one set of self-capacitance change data array respectively into one set of coordinate data array;
    G. Execute Step H;
    H. Acquire the final coordinate data of the touch points;
    The said Step E comprises the following sub-steps:
    E1. According to Q sets of coordinate data arrays, identify whether there is the condition that the touch point is simultaneously located in at least two adjacent self-capacitance electrode assemblies;
    E2. If the condition described in Step E1 occurs, the coordinate data reflecting that the touch point is simultaneously located in at least two adjacent self-capacitance electrode assemblies shall be combined into one coordinate data;

E3. If the condition described in Step E1 does not occur, Q sets of coordinate data arrays shall be adopted;

E4. Execute Step H;

The said Sub-step E1 also comprises the following sub-steps;

E11. Set the minimum distance threshold of the coordinate;

E12. Execute Step E13 for all coordinate data respectively in proper order;

E13. Calculate the coordinate distance between the coordinate point confirmed by the coordinate data and the coordinate points confirmed by other coordinate data respectively, and judge whether the near range coordinate point at which the coordinate distance is shorter than the minimum distance threshold of the said coordinate exists; if the near range coordinate point exists, record a set of overlapping coordinate data array, and such overlapping coordinate data include the coordinate data corresponding to all near range coordinate points and data of this coordinate;

E14. After Step E13 has been executed to all coordinate data respectively in proper order, if at least one set of overlapping coordinate data array is acquired, execute Sub-step E2;

E15. After Step E13 has been executed to all coordinate data respectively in proper order, if overlapping coordinate data array hasn't been acquired, execute Sub-step E3.

2. The coordinate data processing method according to claim 1, is characterized in that:

The said Sub-step E2 also comprises the following sub-steps:

E21. According to the coordinate data in overlapping coordinate data arrays, calculate the coordinate data of the centroid of the area which is surrounded by all the coordinate points confirmed by all the coordinate data in the overlapping coordinate data array, and the coordinate data of the centroid refers to the coordinate data of the touch point simultaneously located in at least two adjacent self-capacitance electrode assemblies.

\* \* \* \* \*